April 18, 1944.  C. T. WALTER  2,346,953
HAM PUMPING
Filed March 24, 1941  4 Sheets-Sheet 1

ATTEST-

Charles T. Walter
INVENTOR
BY Roy G. Story
ATTORNEY

April 18, 1944.  C. T. WALTER  2,346,953
HAM PUMPING
Filed March 24, 1941  4 Sheets-Sheet 2
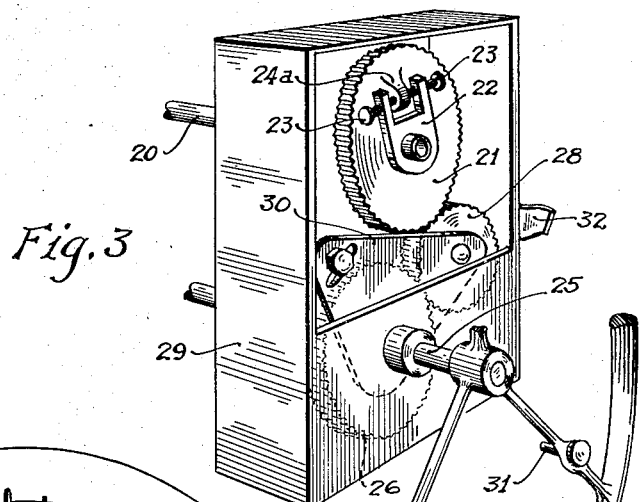
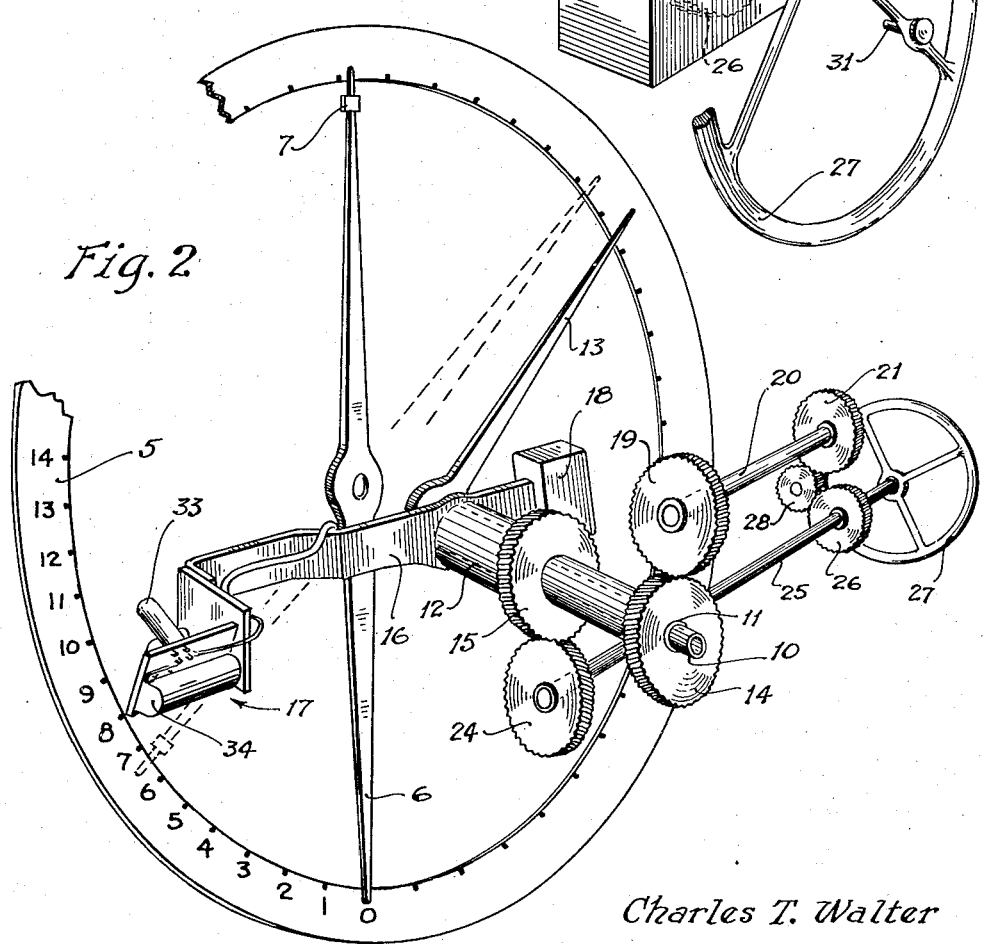
ATTEST -
Charles T. Walter
INVENTOR
BY Roy G. Story
ATTORNEY April 18, 1944.  C. T. WALTER  2,346,953
HAM PUMPING
Filed March 24, 1941  4 Sheets-Sheet 3

ATTEST -

Charles T. Walter
INVENTOR
BY Roy G. Story
ATTORNEY

April 18, 1944.　　　C. T. WALTER　　　2,346,953
HAM PUMPING
Filed March 24, 1941　　　4 Sheets-Sheet 4

ATTEST-

Charles T. Walter
INVENTOR
BY
ATTORNEY

Patented Apr. 18, 1944

2,346,953

UNITED STATES PATENT OFFICE 2,346,953

HAM PUMPING

Charles T. Walter, Chicago, Ill., assignor to Industrial Patents Corporation, Chicago, Ill., a corporation of Delaware Application March 24, 1941, Serial No. 384,896

5 Claims. (Cl. 99—256)

This invention relates to weighing scales for indicating and controlling the amount of pickling brine which is supplied to meat.

One of the objects of this invention is to provide means to accurately control the quantity of curing pickle pumped into meat.

Another object of this invention is to provide means whereby the percentage of pickle which is pumped into the meat may be varied depending upon the characteristics desired in the finished cured product.

Another object of this invention is to provide means whereby a fixed quantity of fluid or pickling brine may be pumped into the meat after the desired proportional quantity has been pumped into the meat.

Another object of this invention is to provide means to reduce the possibility of human error to a minimum and to free the operator from the necessity of keeping a close watch of the weighing operation.

Other objects and advantages of this invention will become apparent from the description and claims which follow.

Like numerals in the several figures indicate similar parts.

Figure 2 is a perspective view illustrating the scale dial and the mechanism for adjusting the control device.

Figure 3 is a perspective view on an enlarged scale of details of the adjusting mechanism.

Figure 1:
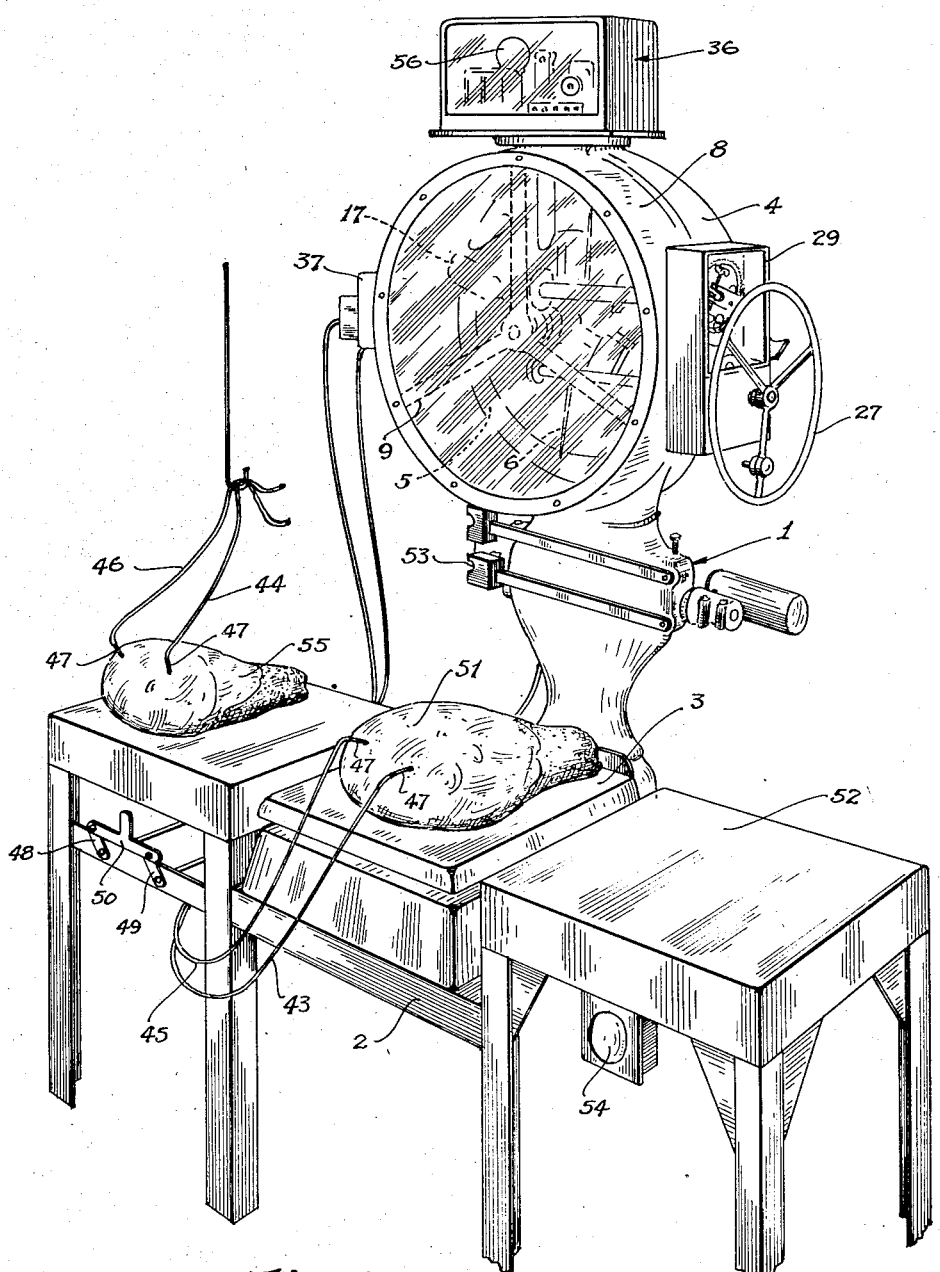
Figure 1 is a perspective view of a scale equipped with my control mechanism.

In the practice of curing meat, for example, hams, by injecting the curing fluid into the vascular system of the product, for example, according to the method disclosed and claimed in United States Patent No. 1,951,436, the quantity of fluid injected into the meat bears a definite relation to the weight of the individual piece of meat. This relationship is generally expressed as a percentage of the net weight of the meat. The value of this percentage varies between wide limits, depending upon the characteristics desired in the finished cured product. For example, in curing hams, a range of from eight per cent to twenty-five per cent is employed in commercial practice, depending upon the individual hams and the type of ham which it is desired to produce.

In accordance with conventional practice of the method described and claimed in United States Patent No. 1,951,436, the operator is required to carry out certain mental operations and several physical operations manually. The operator first places a ham on the weighing platform of the scale to determine its net weight. The injection needles or hypodermic needles are attached to the ham at the desired location, the scales being loaded or counterbalanced to correct for the weight of the needles and other attachments. The operator then notes the net weight of the ham and must consult a chart to determine the quantity of curing fluid which it is desired to pump into the ham. After this quantity has been determined from the chart, the operator must open a valve to admit the curing pickle to the ham. The operator then must constantly watch the scale pointer and must watch the increase in weight of the ham as the injection proceeds. When the scale pointer has indicated that the desired quantity of fluid has been pumped into the ham, the operator must quickly close the valve to arrest the flow of fluid through the injection needle. In the case of certain types of hams, it is required to inject a fixed quantity of curing fluid into the lean portion of the ham which is not connected to the main vascular system. After the bulk of the curing fluid has been pumped into the ham through the vascular system, the operator must then carefully note the weight indicated by the scale needle and must then open a second valve. The desired fixed quantity of fluid is then determined by carefully observing the increase in weight as indicated by the scale needle. When the desired quantity has been pumped into this portion of the ham, the second valve is closed.

It is apparent that the opportunity for error is exceedingly great. The operator may make an error in consulting the chart to determine the quantity of curing fluid to be pumped into the ham and may make errors in closing and opening the valves whereby smaller or greater quantities of fluid are pumped into the ham than are desired. It is also possible that the operator may operate the wrong valve and thereby pump the bulk of the curing fluid into the lean portion of the ham. It is apparent that the operator must constantly watch the scale needle and, therefore, cannot prepare a second ham while the first ham is being pumped.

The present invention contemplates the provision of a control device adapted for use with standard types of weighing scales whereby the usual mental operation and physical operations required of the operator are reduced to a minimum. The operator may attach the pumping needle to the ham before the ham is placed upon the platform of the scale and while the apparatus is automatically pumping curing fluid into another ham on the scale platform. After the ham is placed on the platform, the operator merely makes an adjustment whereby an indexing pointer is brought into register with the scale pointer. The operator then depresses a switch member, and the curing fluid is automatically pumped into the ham in proportion to the initial weight of the ham, after which, if desired, a small fixed quantity of fluid may be pumped into the lean side of the ham. While the fluid is being pumped into the ham on the weighing platform, the operator may prepare a second ham for the pumping operation by attaching the pumping or injection needle to the second ham.

In the apparatus illustrated in the drawings, scale 1 is mounted on table 2. Scale 1 is provided with a scale platform 3 and a scale face housing 4 in which the scale face or scale dial 5 and pointer 6 is mounted. A small mirror 7 (Figure 2) is mounted on the pointer 6 at the end opposite from the reading end of the pointer. The purposes of the mirror will be discussed in detail hereinafter.

Figure 4:
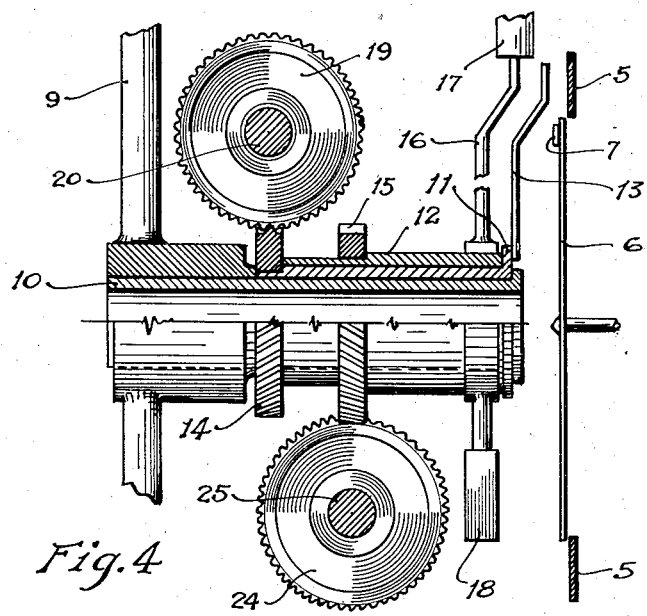
Figure 4 is a side view, partly in section, of a detail of the adjusting mechanism.

A cylindrical housing 8 is secured to the forward face of scale face housing 4. A spider 9 is mounted rigidly within housing 8 and supports the shaft 10 (Figure 2) in a position which is coaxial with the axis of pointer 6. Tubular shaft 11 is mounted rotatably on shaft 10. Sleeve 12 is in turn mounted rotatably on tubular shaft 11. Indexing pointer 13 is rigidly mounted on tubular shaft 11 at the end of the tubular shaft adjacent scale pointer 6. Helical pinion 14 is attached securely to the other end of tubular shaft 11. Helical pinion 15 is mounted securely on sleeve 12. An arm 16 is mounted securely on sleeve 12 adjacent the inner end of the sleeve. An optical or photoelectric unit 17 is mounted rigidly at the end of arm 16. Arm 16 and photoelectric unit 17 may be counterbalanced by means of a counterweight 18. Arm 16 is bent inwardly, as illustrated in Figure 4, so that the photoelectric unit 17 will come into close proximity to mirror 7.

Helical gear 19 meshes with helical pinion 14 at right angles, the helical gear being supported on shaft 20, which is at right angles to shaft 10. A spur gear 21 is mounted on the outwardly projecting end of shaft 20 and is secured to the shaft by means of angular adjusting yoke 22 (Figure 3). Helical pinion 14 and its cooperating helical gear 19 are of identical construction so that upon rotation of spur gear 21 through any given angle, helical pinion 14 and tubular shaft 11, together with the attached indexing pointer 13, are also moved through the same given angle. The angular position of indexing pointer 13, shaft 10, helical pinion 14, helical gear 19, shaft 20, and spur gear 21 may be adjusted and raised to a small extent by thumb screws 23 of yoke 22 and lug 24a which is secured to or integral with spur gear 21.

Helical gear 24 meshes with helical pinion 15 and is supported on shaft 25, which is disposed at a right angle to the shaft 10. Adjacent the outwardly extending end of shaft 25 is mounted securely a spur gear 26. Helical gear 24 and helical pinion 15 are identical in construction so that upon rotation of spur gear 26 through any given angle, helical gear 15, sleeve 12, and the attached arm 16 carrying the photoelectric unit 17, will also be rotated through the same angle. A hand wheel 27 is mounted securely on the outwardly projecting end of shaft 25.

Idler pinion 28 meshes with spur gear 21 and spur gear 26 and thereby connects operatively the shafts 20 and 25.

Since the apparatus is to be employed in locations where the atmosphere contains large amounts of water vapor and since curing pickle, which is employed in curing meats, is corrosive, I prefer to enclose spur gears 21 and 26 and the idler pinion 28 in a waterproof and vaporproof gear box 29. Idler pinion 28 is mounted in operative relationship with the spur gears by means of an adjustable plate 30. A pin 31 is secured to a spoke of the hand wheel 27, which cooperates with stop plate 32, which is rigidly secured to the gear box 29 whereby the rotation of shafts 25 and 20 are limited to substantially one complete revolution. It is apparent that as hand wheel 27 is rotated, shaft 25, idler pinion 28 and shaft 20 are rotated. The angular rotation of shaft 20 with respect to the angular rotation of shaft 25 is obviously dependent upon the relationship between the number of teeth in spur gear 26 with respect to the number of teeth in spur gear 21.

Figure 5:
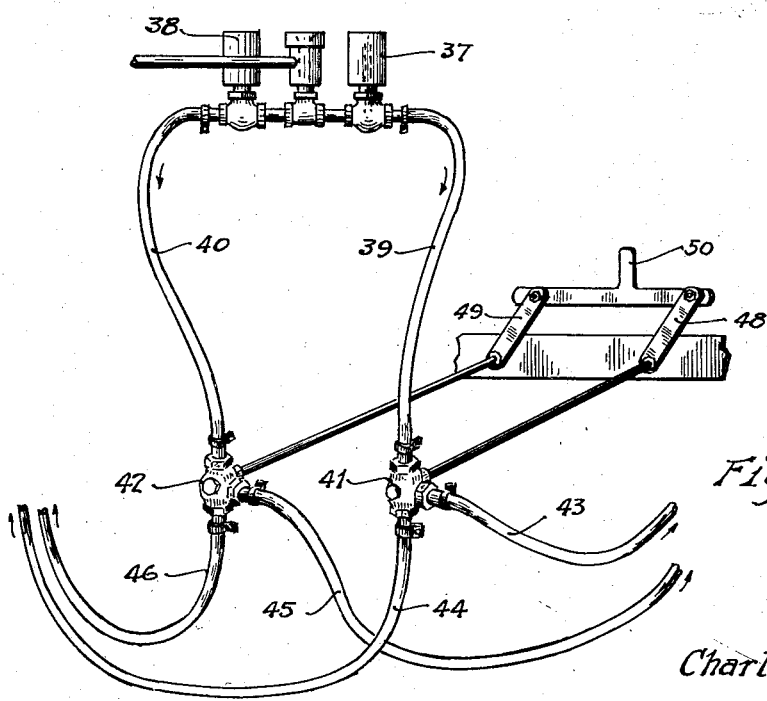
Figure 5 is a perspective view of the valve means for controlling the flow of pickling brine through the brine line.
Figure 6:
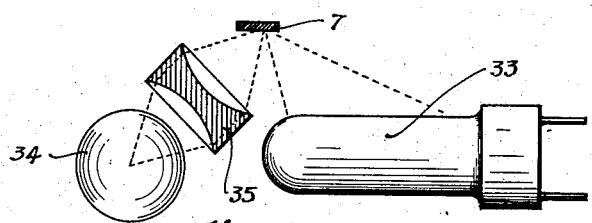
Figure 6 is a diagrammatic view of the optical portion of the control system.

The photoelectric unit 17 consists essentially of a photoelectric cell 33, a light source 34, and a condenser lens system 35 (Figure 6), which is adapted to be adjusted to produce a sharp narrow spot or line of light at the focal point of the system which coincides with the plane of the mirror 7. Whenever any part of mirror 7 is in a position whereby it intercepts light from the light source 34, the light will be reflected into photoelectric tube 33. The photoelectric unit 17 is connected electrically with control unit 36 (Figure 1), which is in turn connected electrically to solenoids 37 and 38 (Figure 5), which are adapted to control the flow of curing pickle through the lines 39 and 40, containing valves 41 and 42. Flexible lines 43 and 44 and flexible lines 45 and 46 are connected to valves 41 and 42, respectively. Lines 43, 44, 45, and 46 may be of heavy rubber tubing and are fitted with pumping needles 47 (Figure 1). Valves 41 and 42 are adapted to permit the curing fluid to flow through lines 43 and 45 or 44 and 46. Two pairs of flexible tubings are provided so that the operator may insert the pumping needles into one ham during the period in which the curing pickle is pumped into the other ham. The pairs of flexible tubings are opened to lines 39 and 40 simultaneously by operating valves 41 and 42 through levers 48 and 49, respectively, and hand bar 50.

Assuming for the purposes of illustration that it is desired to inject into the ham ten per cent curing pickle, based on the weight of the ham, and that it is desired to inject into the lean side of the ham three ounces of curing pickle after the desired proportional amount has been injected, valve 41 is employed to control the injection of the ten per cent quantity, and valve 42 is employed in injecting the fixed quantity, namely, the three ounces of curing pickle. After the scale has come to rest and the pointer 6 indicates the weight of the ham, valve 41 is opened to permit injection of the proportional quantity of curing pickle into the ham. It is desired to arrest the flow of curing pickle or close valve 41 after ten per cent pickle has been pumped into the ham. Photoelectric cell 33 controls the closing of valve 41 and should, therefore, receive reflected light from mirror 7 at the instant the scale indicates that the weight on the scale platform has been increased ten per cent, based on the net weight of the ham. Since mirror 7 is diametrically opposite the indicating end of pointer 6, the focal point of the optical or photoelectric unit 17 should be advanced with respect to mirror 7 an amount equivalent to ten per cent of the net weight of the ham.

Photoelectric unit 17 is positioned by placing indexing pointer 13 in register with the indicating end of pointer 6. For any given angular displacement of indexing pointer 13, photoelectric unit 17 must be moved through an angular distance equal to the angular displacement of indexing pointer 13 plus ten per cent of the angular motion of indexing pointer 13. The proportional movement of indexing pointer 13 of photoelectric unit 17 is secured through the relationship between the number of teeth in spur gears 21 and 26. As a matter of convenience, assume that spur gear 26 has one hundred teeth. Spur gear 21, therefore, has one hundred plus ten per cent of one hundred, or one hundred ten teeth. Idler pinion 28 may have any convenient number of teeth, this pinion merely being provided to form an operative connection between spur gears 21 and 26. Assuming that spur gear 21 makes one complete revolution, one hundred ten teeth pass a given fixed point. Spur gear 26 through idler pinion 28 will, therefore, also rotate through an angular displacement sufficient to move one hundred ten teeth past a given fixed point. Spur gear 26, therefore, will rotate one full revolution plus ten per cent of a complete revolution. In other words, for any given angular displacement of spur gear 21, spur gear 26 will rotate one hundred ten per cent of the given angular displacement of spur gear 21. As was explained before, indexing pointer 13 rotates through the same angular displacement as does spur gear 26. Photoelectric unit 17 carried on arm 16 will be displaced an angular distance equal to the angular displacement of spur gear 26. It is apparent, therefore, that the photoelectric unit 17 will be rotated an angular distance equal to one hundred ten per cent of the angular rotation of indexing needle 13.

The operator inserts pumping needles 47 into ham 51 and places or slides the ham from platform 52 onto scale platform 3. The tare or weight of pumping needles 47 and flexible tubings 43 and 45 is counterbalanced or compensated by adjustment of the balance weight 53 (Figure 1). Scale needle 6 will, therefore, indicate the net weight of ham 51. The operator then rotates hand wheel 27 through an angular distance sufficient to rotate indexing needle 13 to bring the indexing pointer into register with the scale needle 6. Photoelectric unit 17 will, therefore, be rotated through an angular distance ten per cent greater than the angular distance through which indexing pointer 13 has been moved. In adjusting the zero setting of the apparatus, indexing pointer 13 is brought into register with pointer 6 at the zero indicia on the scale dial 5. Photoelectric unit 17 should then be positioned so that the focal point of the light source and lens is coincident with the leading edge of mirror 7. Thumb screws 23 on yoke 22 permit a fine adjustment of the angular relation between spur gear 21 and shaft 20 and, therefore, between indexing pointer 13 and photoelectric cell 17 through their respective gears and associated shafts. In the zero position of the photoelectric unit 17, a very slight movement of the mirror will cause a reflection of the light from light source 34 into photoelectric cell 33. The magnitude of the minimum motion of the mirror required to reflect the light into the photoelectric cell is a measure of the sensitiveness of the control system. This sensitiveness depends in a large measure upon the narrowness or sharpness of the light at the plane of mirror 7.

The ham placed upon the scale platform 3 will cause the pointer 6 to assume a position, for example, a position as illustrated by the broken lines in Figure 2. Indexing pointer 13 is then rotated into a position in which it registers with the scale pointer 6 by means of the hand wheel 27. The photoelectric unit 17 will be moved through an angle which is ten per cent greater than the angle through which scale pointer 6 and indexing pointer 13 have moved. The focal point of the optical system will have been moved to a position in advance of the leading edge of mirror 7 by an amount which is equal to the distance between the initial weight of the ham and the desired final weight of the ham after the proportional quantity of curing fluid has been pumped into the ham.

After the operator has aligned indexing pointer 13 with scale pointer 6, solenoid valve 37 is opened and light source 34 is illuminated through relay control unit by the operator depressing starting switch 54 (Figure 1). The relay control unit 36, as will be described hereinafter, is so designed that the solenoid valve 37 will remain open as long as no light is reflected into photoelectric cell 33. When the weight of the ham has been increased sufficiently to bring the leading edge of mirror 7 into a position coincident with the focal point of the optical system of the photoelectric unit, light is reflected into photoelectric cell 33. Since the focal point of the photoelectric unit is advanced with respect to mirror 7, a distance equivalent to a proportional amount of the weight of the ham, valve 37 will remain open to permit the flow of curing pickle into the ham until the desired proportional amount has been added to the weight of the ham. Light striking photoelectric cell 33 operates the relay control unit 36 to close solenoid valve 37 and simultaneously open solenoid valve 38. Valve 38 controls the flow of pickle into the intermuscular injection needle or the injection needle which is thrust into the lean portion of the ham. The relay control unit 36 is so designed that valve 38 remains open as long as light is reflected into photoelectric cell 33. The quantity of fluid which is pumped through the valve while it is open is dependent upon the width of mirror 7. For example, if it is desired to inject about three ounces of curing fluid after the desired proportional quantity has been injected into the ham, the angular width of mirror 7 is equivalent to a differential of three ounces on scale dial 5. As this additional quantity of curing fluid is pumped into the ham, the scale pointer will be moved and as the trailing edge of mirror 7 passes beyond the focal point of the optical unit of photoelectric unit 17, the photoelectric cell will become de-energized. At the same time, the valve 38 is closed and light source 34 is extinguished so that valves 37 and 38 will not unavoidably become opened. The relay control 36 is automatically reset and ready for a second cycle. The operator then removes ham 51 from the scale platform and places ham 55 upon the scale platform. When the pumping cycle of ham 55 is begun, the operator removes pumping needle 47 from ham 51 and inserts the needle into a third ham.

Figure 7:
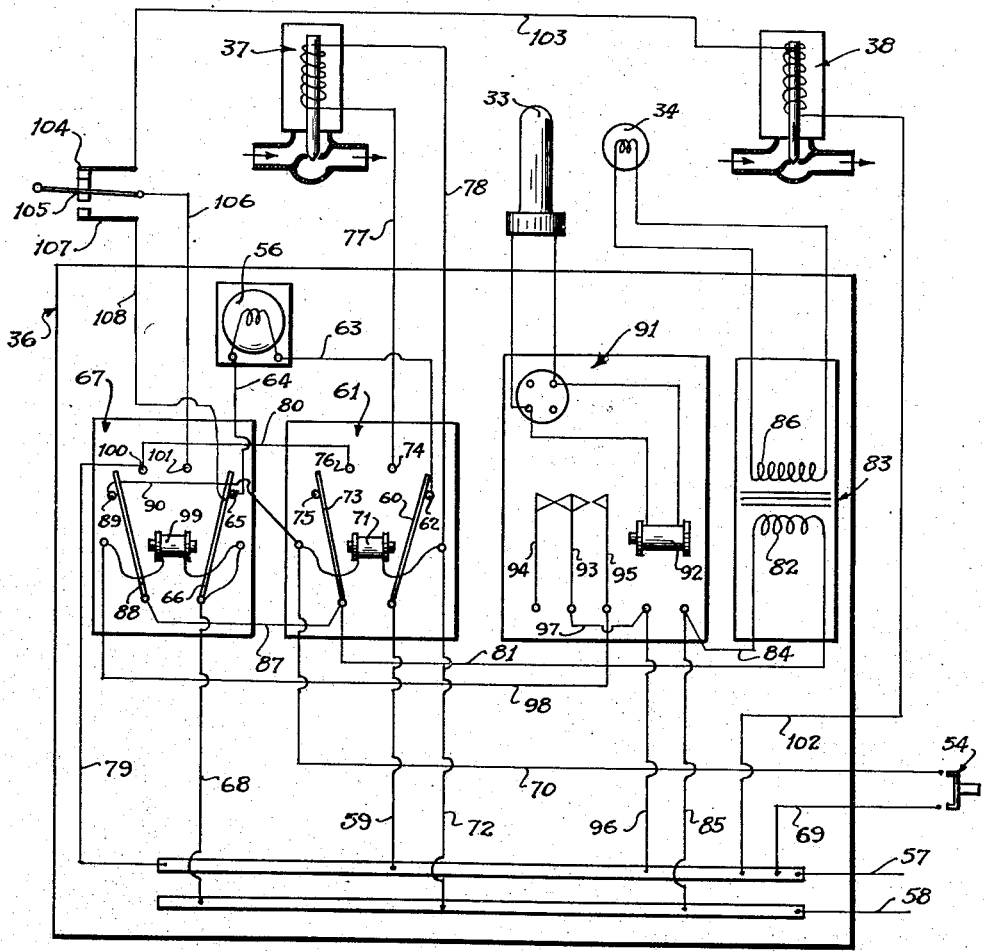
Figure 7 is a wiring diagram of the electrical control system.

The wiring diagram of the control unit 36 and its connection with the photoelectric cell 33, light source 34, and solenoid valves 37 and 38 is illustrated in Figure 7. The relays are shown in their normal position, namely, with their holding coils not energized. In the position of the elements, as illustrated in Figure 7, solenoid valves 37 and 38 are both closed, and the control unit is prepared for the start of the pumping cycle. At the end of any cycle and up to the time of the beginning of another cycle, pilot light 56 remains illuminated and serves as an indication that the control system is inoperative. The pilot light receives its power from lines 57 and 58 through conductor 59, relay leaf 60 of relay 61, contact point 62, conductor 63, conductor 64, contact point 65, relay leaf 66 of relay 67, and conductor 68.

As was pointed out before, after the ham is placed upon scale platform 3 and indexing pointer 13 has been moved into register with scale pointer 6, the operator depresses switch 54. On closing of switch 54, current flows from line 57 through conductor 69, switch 54, conductor 70, relay coil 71, conductor 72 and line 58, thereby energizing relay coil 71 of relay 61. Upon energization of relay coil 71, relay leaf 60 and relay leaf 73 are drawn toward the armature of relay coil 71. Relay leaf 60 is thereby moved from contact point 62 to contact point 74, and relay leaf 73 is moved from stop 75 to contact point 76. As relay leaf 60 is moved from contact point 62, the circuit through pilot light 56 is broken and the pilot light is extinguished. As relay leaf 60 contacts contact point 74, current flows from line 57 through conductor 59, relay leaf 60, contact point 74, conductor 77, solenoid valve 37, conductor 78, conductor 72, and line 58, thereby opening valve 37. As relay leaf 73 of relay 61 contacts contact point 76, current flows from line 57 through conductor 79, conductor 80, contact point 76, relay leaf 73, conductor 81, primary 82 of transformer 83, conductor 84, and conductor 85, to line 58, thereby illuminating light source 34 through the secondary 86 of transformer 83 to which the light source is connected directly.

When switch 54 is released or opened, relay coil 71 of relay 61 remains energized since current flows from line 57 through conductor 79, conductor 80, contact point 76, relay leaf 73, conductor 87, relay leaf 88 of relay 67, contact point 89, conductor 90, relay coil 71, conductor 72, to line 58. Through this holding circuit the relay 61 remains energized and solenoid valve 37 remains open after switch 54 is released or opened. Solenoid valve 37 remains open as long as relay 61 is energized. Relay 61 becomes de-energized when light is reflected from light source 34 into photoelectric cell 33 by means of mirror 7.

As was explained before, photoelectric unit 17 is advanced with respect to the leading edge of mirror 7 an amount which is equal to the desired proportion of curing fluid which it is desired to pump into the ham. Solenoid 37 will, therefore, remain open until the gross weight on the scale platform has reached a point at which the leading edge of mirror 7 reflects light from light source 34 to photoelectric cell 33. As soon as the leading edge of mirror 7 coincides with the focal point of the optical system of photoelectric unit 17, light is reflected from the light source into the photoelectric cell. Photoelectric cell 33 is connected electrically to photoelectric relay 91. When photoelectric cell 33 is illuminated, relay coil 92 becomes energized. Energization of relay coil 92 causes relay leaf 93 to move from stop 94 to contact leaf 95. Current then flows from line 57 through conductor 96, conductor 97, relay leaf 93, contact leaf 95, conductor 98, relay coil 99, conductor 68 to line 58, thereby energizing relay coil 99 of relay 67. Energization of relay 67 causes relay leaf 88 to move from contact point 89 to contact point 100. Movement of relay leaf 88 from contact point 89 to 100 opens the circuit from line 57 through conductor 79, conductor 80, contact point 76, relay leaf 73, conductor 87, relay leaf 88, contact point 89, conductor 90, relay coil 71, and conductor 72 to line 58, thereby deenergizing relay coil 71 of relay 61. De-energization of relay coil 71 causes relay leaf 60 to drop from contact point 74 to contact point 62 and relay leaf 73 from contact point 76 to contact point 75. Movement of relay leaf 60 from contact point 74 to contact point 62 opens the circuit from line 57 to conductor 59, relay leaf 60, contact point 74, conductor 77, solenoid valve 37, conductor 78, conductor 72 to line 58 and thereby de-energizes solenoid valve 37, whereby the valve is closed. Closing of valve 37 arrests the flow of curing fluid to the ham. At the time valve 37 is closed the desired proportional quantity of curing fluid has been pumped into the ham.

Movement of relay leaf 66 from contact point 65 to contact point 101 causes current to flow from line 57 through conductor 102, solenoid valve 38, conductor 103, switch point 104, main switch 105, conductor 106, contact point 101, relay leaf 66, and conductor 68 to line 58, thereby energizing the solenoid of solenoid valve 38 and opening valve 38. Opening of solenoid valve 38 permits curing fluid to flow through line 45 and into the ham. Relay coil 99 of relay 67 remains energized as long as light is reflected into the photoelectric cell 33. Consequently, solenoid valve 38 is held in open position as long as light is reflected from the light source 34 into the photoelectric cell 33. It is apparent, therefore, that if it is desired to pump a fixed quantity, for example, three ounces of curing fluid into the lean portion of the ham, the angular width of mirror 7 should be equivalent to the differential of three ounces on the scale dial.

As the curing fluid is pumped into the ham, the scale needle 6 and the attached mirror are moved in proportion to the increase in weight and as the trailing edge of mirror 7 passes the focal point of the optical system of photoelectric unit 17, photoelectric cell 33 becomes darkened. Darkening of photoelectric cell 33 causes a de-energization of photoelectric relay coil 92, and relay leaf 93 moves from contact leaf 95 to stop 94. This movement of relay leaf 93 opens the circuit from line 57 through conductor 96, conductor 97, relay leaf 93, contact leaf 95, conductor 98, relay coil 99, conductor 68, and line 58, thereby de-energizing relay coil 99 and allowing relay leaf 66 to drop. As relay leaf 66 moves from contact point 101 to contact point 65, the circiut from line 57 through conductor 102, solenoid valve 38, conductor 103, switch point 104, main switch 105, conductor 106, contact point 101, relay leaf 66, and conductor 68 to line 58 is opened and solenoid valve 38 becomes de-energized and closes. Closing of this valve arrests the flow of curing fluid through line 45 into the ham.

As relay leaf 88 is moved from contact point 100 to contact point 89, the circuit from line 57 through conductor 79, contact point 100, relay leaf 88, conductor 87, conductor 81, primary 82 of transformer 83, conductor 84, and conductor 85 to line 58 is opened, thereby extinguishing light source 34. Relay coil 99 cannot be energized, hence relay leaf 93 and contact leaf 95 remain open as long as the photoelectric cell 33 remains darkened. Relay coil 71 cannot become energized unless switch 54 is closed. Light source 34 is extinguished so that upon removal of the ham from the scale platform, mirror 7 as it passes the focal point of the optical unit of photoelectric unit 17 will not reflect light into the photoelectric cell 33 and accidentally open valve 38.

Upon de-energization of relay coil 99 of relay 67 and upon movement of relay leaf 66 from contact point 101 to contact point 65, the circuit from line 57 through conductor 59, relay leaf 60, contact point 62, conductor 63, pilot light 56, conductor 64, contact point 65, relay leaf 66, and conductor 68 to line 58 is reestablished and the pilot light is again illuminated, thus indicating to the operator that the pumping cycle has been completed. The relay system is then prepared for another pumping cycle. The operator may then remove ham 51 from scale platform 3 and place ham 55 upon the scale platform. Hand bar 50 is then moved to close the lines 43 and 45 to valves 37 and 38 and open lines 44 and 46 to valves 37 and 38, respectively. The operator then closes switch 54 and the pumping cycle is repeated.

In pumping certain types of meat products, all of the curing fluid is injected into the vascular system of the piece of meat. In such cases it is unnecessary to employ both valve 37 and valve 38. In such cases it is desired to pump a definite proportion of curing fluid into the ham or other meat product, for example, 10 per cent. As is apparent, only valve 37 would, therefore, be necessary. Solenoid valve 38 is removed from the electrical control circuit by means of switch 105. Movement of knife switch 105 from contact point 104 to switch point 107 opens any possible circuit through valve 38 and valve 38 remains inoperative. It is apparent that movement of knife switch 105 from point 104 to point 107 does not affect the control or operation of solenoid valve 37. In this position of knife switch 105, when switch 54 is closed, current flows from line 57 through conductor 69, switch 54, conductor 70, relay coil 71 of relay 61, conductor 72 to line 58. Energization of relay coil 71 causes relay leaf 60 to be moved from contact point 62 to 74 and relay leaf 73 from stop 75 to contact point 76. Movement of relay leaf 60 from contact point 62 to contact point 74 opens the circuit through pilot light 56, and current flows from line 57 through conductor 59, relay leaf 60, contact point 74, conductor 77, solenoid valve 37, conductor 78, conductor 72 to line 58 and thereby causes the solenoid valve 37 to open. At the same time, pilot light 56 is extinguished by breaking of the circuit between relay leaf 60 and contact point 62. Movement of relay leaf 73 into contact with contact point 76 causes current to flow from line 57 through conductor 79, conductor 80, contact point 76, relay leaf 73, conductor 81, primary 82 of transformer 83, conductor 84, and conductor 85 to line 58. Current flowing through primary 82 causes an illumination of light source 34. Solenoid valve 37 remains open as long as photoelectric cell 33 is darkened. When sufficient curing fluid has been pumped into the meat on the scale platform, scale pointer 6 and the attached mirror 7 move sufficiently to come into position of the focal point of the optical system of photoelectric unit 17, and light is reflected from light source 34 into photoelectric cell 33. Illumination of photoelectric cell 33 causes an energization of relay coil 92 of photoelectric relay 91, and relay leaf 93 is moved from stop 94 into contact with contact leaf 95. When switch 54 is released or opened, current flowing from line 57 through conductor 79, conductor 80, contact point 76, relay leaf 73, conductor 87, relay leaf 88, contact point 89, conductor 90, relay coil 71 and conductor 72 to line 58, thereby holding relay leaf 60 and relay leaf 73 in contact with contact points 74 and 76, respectively. Movement of relay leaf 93 from stop 94 to contact leaf 95 causes current to flow from line 57 through conductor 96, conductor 97, relay leaf 93, contact leaf 95, conductor 98, relay coil 99 of relay 67, and conductor 68 to line 58. Upon energization of relay coil 99, relay leaf 66 and relay leaf 88 are drawn toward the core of relay coil 99. Movement of relay leaf 88 from contact point 89 to contact point 100 de-energizes relay coil 71 of relay 61 by opening the circuit from line 57 through conductor 79, conductor 80, contact point 76, relay leaf 73 of relay 61, conductor 87, relay leaf 88, contact point 89, conductor 90, relay coil 71, and conductor 72 to line 58. Light source 34 remains illuminated by current flowing from line 57 through conductor 79, contact point 100, relay leaf 88, conductor 87, conductor 81, primary 82 of transformer 83, conductor 84, and conductor 85 to line 58. Upon de-energization of relay coil 71, relay leaf 73 moves from contact point 76 to stop 75, the circuit controlling the illumination of the light source 34, however, being closed through contact point 100, relay leaf 88, and conductor 87.

Movement of relay leaf 60 from contact point 74 to contact point 62 opens the circuit through solenoid valve 37, thereby closing valve 37 and arresting the flow of curing pickle to the meat. The simultaneous movement of relay leaf 66 from contact point 65 to contact point 101 permits current to flow from line 57 through conductor 59, relay leaf 60, contact point 62, conductor 63, pilot light 56, conductor 64, conductor 108, switch contact 107, switch 105, conductor 106, contact point 101, relay leaf 66, and conductor 68 to line 58, thereby illuminating the pilot lamp. Illumination of the pilot lamp 56 serves as an indication to the operator that the pumping cycle or operation has been completed.

As the operator removes the meat from the scale platform, scale pointer 6 and the attached mirror 7 again return to the zero position, and the photoelectric cell 33 becomes darkened. Darkening of photoelectric cell 33 causes de-energization of relay coil 92 of photoelectric relay 91, thereby moving relay leaf 93 from contact 95 to stop 94. This movement of relay leaf 93 opens the circuit from line 57 through conductor 96, conductor 97, relay leaf 93, contact leaf 95, conductor 98, relay coil 99, and conductor 68 to line 58, thereby de-energizing relay coil 99. De-energization of relay coil 99 causes relay leaf 66 and relay leaf 88 to drop to their original positions and the control unit is reset for a second cycle. Movement of relay leaf 66 from contact point 101 to contact point 65 has no effect upon the pilot light. The movement of relay leaf 88 from contact point 100 to contact point 89 opens the circuit from line 57 through conductor 79, contact point 100, relay leaf 88, conductor 87, conductor 81, primary 82 of transformer 83, conductor 84, and conductor 85 to line 58 and thereby extinguishes light source 34.

Since the control apparatus is employed under conditions which are very unfavorable, the elements must be protected from moisture and curing pickle to avoid deterioration. In the use of the device or apparatus in pumping hams, for example, the scale and control device are installed in locations where the atmosphere is very humid. Switch 54 is preferably mounted in an air tight box having a rubber diaphragm over the switch so that it may be readily operated. The control unit 36 is contained in a waterproof and vaporproof container having a glass front so that the operator may observe the operation of the pilot light 56. The scale face housing 4 is preferably sealed to prevent entrance of vapors and moisture, and the control housing 8 is secured to the scale face housing 4 to provide a vaporproof and waterproof seal between the two housings. The front face of housing 8 is preferably provided with a glass front which is also sealed to provide a vaporproof and moistureproof joint. Shafts 20 and 25 project through the housing 8 and into gear box 29 and are provided with suitable sleeves to provide a vaporproof and waterproof seal to prevent entrance of moisture or water into the scale face housing. Gear box 29 is also provided with a cover which is tightly clamped to a rubber gasket to provide a vaporproof and waterproof seal to prevent deterioration of the moving parts.

Obviously many modifications and variations of the invention hereinbefore set forth may be made without departing from the spirit and scope thereof, and therefore only such limitations should be imposed as are indicated in the appended claims.

I claim:

1. A scale for controlling the amount of pickle to be pumped into a meat product including a scale having a weighing system and a load receiving element; a scale pointer operatively connected to said weighing system to indicate the weight of the load on said element; a means to inject pickle into the meat on said element including valve means and means to force the pickle under pressure into the meat; a movable indexing pointer to cooperate with said scale pointer; a movable photoelectric system including a light stream for cooperating with the scale pointer; means interconnecting the indexing pointer and the photoelectric system whereby the photoelectric system will be advanced ahead of the indexing means a predetermined percentage of the movement of the indexing means; actuating means in circuit with said photoelectric system to operate said valve means for controlling the admission of pickle to the meat such that once the indexing pointer is set to coincide with the initial indication of the scale pointer when the meat is placed on the load receiving element, the pumping operation may be started and it will continue until the scale pointer meets the photoelectric means as weight is added to the meat on the scale whereupon the pumping of pickle into the meat is automatically discontinued.

2. A scale for controlling the amount of pickle to be pumped into the vascular system and lean portions of a meat product including a scale having a weighing system and a load receiving element; a scale pointer operatively connected to said weighing system to indicate the weight of the load on said element and means to inject pickle into the vascular system and lean portion of the meat on said element including a plurality of valve means; one of said valve means serving to control the flow of pickle to the vascular system of the meat and another of said valve means serving to control the flow of pickle to the lean portion of the meat; and means to force the pickle under pressure into the vascular system and lean portions of the meat; a movable indexing pointer to cooperate with said scale pointer; a movable photoelectric system including a light stream for cooperating with the scale pointer; said scale pointer having means thereon for interrupting the light stream; means interconnecting the indexing pointer and the photoelectric system whereby the photoelectric system will be advanced ahead of the indexing means a predetermined percentage of the movement of the indexing means; actuating means in circuit with said photoelectric system to operate said valve means for controlling the admission of pickle to the meat such that once the indexing pointer is set to coincide with the initial indication of the scale pointer when the meat is placed on the load receiving element, a pumping operation may be started to pump pickle into the vascular system of the meat which will continue until the scale pointer interrupts the light stream whereupon the valve means controlling the admission of pickle to the vascular system is cut off and a second valve means is opened to permit the pumping of the pickle to the lean portion of the meat, and when the means carried on the scale pointer moves out of the light stream, the pumping of pickle into the lean portion will be discontinued.

3. In a system for pumping a pickling fluid into a meat, a scale having a weighing system and weight indicating means, indexing means associated with said scale, control means cooperating with said indexing means, said control means being driven from said indexing means such that it will be advanced a predetermined percentage ahead of the indexing means as the indexing means is moved to its initial setting, means to supply pickling fluid under pressure to said meat, said pickling delivering means including valve means and a plurality of flexible fluid pipe connections between the valve means and the meat, means to selectively position the valve means to cause the delivery of pickle into one of said hose connections whereby either one hose or the other may be placed in operation to deliver the fluid to the meat, said control means being responsive to said weight indicating means whereby the valve means is cut off after a predetermined additional percentage of weight has been added to the meat on the scale.

4. In a machine for pumping a meat product with a pickling fluid, the combination of a pair of solenoid actuated valves for controlling the pumping of fluid to the vascular system and lean portion of the meat respectively, a relay for establishing a circuit to cause said valve controlling the flow of fluid to the vascular system of the meat to be driven to open position as long as said relay is energized, means to establish a circuit through said relay for holding it energized, said holding circuit including a second and normally de-energized relay and means including a photoelectric system and a third relay to break said holding circuit and to establish a circuit through said normally de-energized relay when the vascular system has been filled, said second relay completing a circuit through the solenoid of said other valve when it is energized to cause said other valve to be moved to open position, said second relay becoming de-energized when said photoelectric system functions again and said third relay is returned to its normal position whereupon said other valve is closed.

5. A scale for use during a meat pickle pumping operation having in combination a weighing system, a meat receiving element, and a movable scale pointer operatively connected to said weighing system, a movable indexing means cooperating with the scale pointer, inter-geared means to drive the indexing means around the scale dial, said inter-geared means including a drive for imparting rapid movement to the indexing means, one of the gears of said drive being rotatably fixed to a shaft, means for rotatably adjusting said gear with respect to said shaft to impart a relatively slow movement to the indexing pointer, said indexing means including an indexing pointer co-operating with the scale pointer and a second indexing pointer connected to said other indexing pointer through said inter-geared drive so that their relative movements are related, and pickle pumping means to force pickle into the meat, said pumping means having control means associated therewith to interconnect the scale and indexing system with the pumping means, whereby when a meat product is placed upon said load-receiving element its weight may be determined and the indexing means may be rapidly and accurately coordinated with the scale pointer and the control means being operative so that after the pumping operation has been initiated the control means will discontinue the pumping operation after the scale pointer meets the second indexing pointer.

CHARLES T. WALTER.